: US010200889B2

United States Patent
Seo et al.

(10) Patent No.: US 10,200,889 B2
(45) Date of Patent: Feb. 5, 2019

(54) METHOD FOR RECEIVING SIGNAL USING DISTRIBUTION STORAGE CACHE RETENTION AUXILIARY NODE IN WIRELESS COMMUNICATION SYSTEM, AND APPARATUS THEREFOR

(71) Applicants: LG ELECTRONICS INC., Seoul (KR); KOREA ADVANCED INSTITUTE OF SCIENCE AND TECHNOLOGY, Daejeon (KR); RESEARCH & BUSINESS FOUNDATION SUNGKYUNKWAN UNIVERSITY, Suwon-si, Gyeonggi-do (KR)

(72) Inventors: Hanbyul Seo, Seoul (KR); Wan Choi, Seoul (KR); Dongin Kim, Seongnam-si (KR); Bi Hong, Daejeon (KR); Hojin Song, Daejeon (KR); Tae Yeong Kim, Suwon-si (KR)

(73) Assignees: LG ELECTRONICS INC., Seoul (KR); KOREA ADVANCED INSTITUTE OF SCIENCE AND TECHNOLOGY, Daejeon (KR); RESEARCH & BUSINESS FOUNDATION SUNGKYUNKWAN UNIVERSITY, Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/553,812

(22) PCT Filed: Mar. 18, 2016

(86) PCT No.: PCT/KR2016/002779
§ 371 (c)(1),
(2) Date: Aug. 25, 2017

(87) PCT Pub. No.: WO2016/148542
PCT Pub. Date: Sep. 22, 2016

(65) Prior Publication Data
US 2018/0054747 A1 Feb. 22, 2018

Related U.S. Application Data

(60) Provisional application No. 62/211,861, filed on Aug. 30, 2015, provisional application No. 62/135,149, filed on Mar. 18, 2015.

(51) Int. Cl.
| | | |
|---|---|---|
| *H04W 24/02* | (2009.01) | |
| *H04L 29/08* | (2006.01) | |
| *H04W 28/08* | (2009.01) | |
| *H04W 28/02* | (2009.01) | |
| *H04W 84/04* | (2009.01) | |

(Continued)

(52) U.S. Cl.
CPC ......... *H04W 24/02* (2013.01); *H04L 67/1095* (2013.01); *H04L 67/28* (2013.01);
(Continued)

(58) Field of Classification Search
CPC .......................... H04W 24/02; H04W 28/0205
See application file for complete search history.

(56) References Cited

U.S. PATENT DOCUMENTS

2003/0217113 A1* 11/2003 Katz ................. H04L 29/06
709/213
2009/0168795 A1* 7/2009 Segel .................. H04L 67/104
370/429
(Continued)

FOREIGN PATENT DOCUMENTS

JP 2007-324781 A 12/2007
KR 10-2013-0021921 A 3/2013
(Continued)

*Primary Examiner* — Gary Mui
(74) *Attorney, Agent, or Firm* — Birch, Stewart, Kolasch & Birch, LLP

(57) ABSTRACT

Disclosed in the present application is a method for a terminal receiving data in a wireless communication system. Specifically, the method comprises the steps of determining
(Continued)

at least one transmission subject for the data among one or more auxiliary nodes and a base station; receiving a distributed code from the determined at least one transmission subject; and obtaining the data from the distributed code, wherein the at least one transmission subject is determined based on the sum of the distributed codes stored in the auxiliary nodes and the number of auxiliary nodes existing within a predetermined distance from the terminal.

10 Claims, 10 Drawing Sheets

(51) Int. Cl.
    *H04W 88/02*         (2009.01)
    *H04W 88/04*         (2009.01)

(52) U.S. Cl.
    CPC ....... *H04W 28/0205* (2013.01); *H04W 28/08* (2013.01); *H04W 84/04* (2013.01); *H04W 84/042* (2013.01); *H04W 88/02* (2013.01); *H04W 88/023* (2013.01); *H04W 88/04* (2013.01)

(56) References Cited

U.S. PATENT DOCUMENTS

| | | |
|---|---|---|
| 2012/0322486 A1 | 12/2012 | Kameno et al. |
| 2015/0003234 A1* | 1/2015 | Samardzija ......... H04L 67/2847 370/229 |
| 2015/0207896 A1* | 7/2015 | Llorca ................. H04L 67/1097 709/213 |
| 2015/0208209 A1* | 7/2015 | Jamadagni .............. H04W 4/06 370/312 |
| 2016/0105202 A1* | 4/2016 | Tosato ................ H03M 13/373 714/776 |
| 2016/0226735 A1* | 8/2016 | Tulino .................... H04L 67/00 |
| 2016/0337075 A1* | 11/2016 | Mohamad .......... H04B 7/15521 |
| 2017/0310438 A1* | 10/2017 | Kim .......................... H04B 7/02 |
| 2018/0054747 A1* | 2/2018 | Seo ....................... H04W 24/02 |
| 2018/0213442 A1* | 7/2018 | Kim .................. H04W 72/0426 |

FOREIGN PATENT DOCUMENTS

| | | |
|---|---|---|
| KR | 10-2013-0085291 A | 7/2013 |
| KR | 10-2013-0102326 A | 9/2013 |

\* cited by examiner

FIG. 2
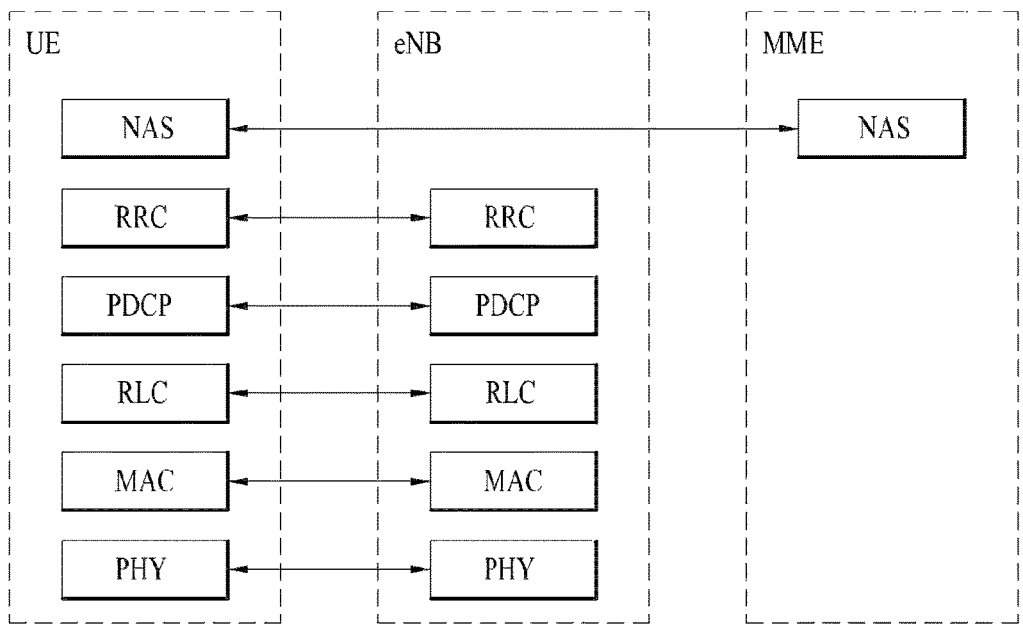
(a) Control-plane protocol stack
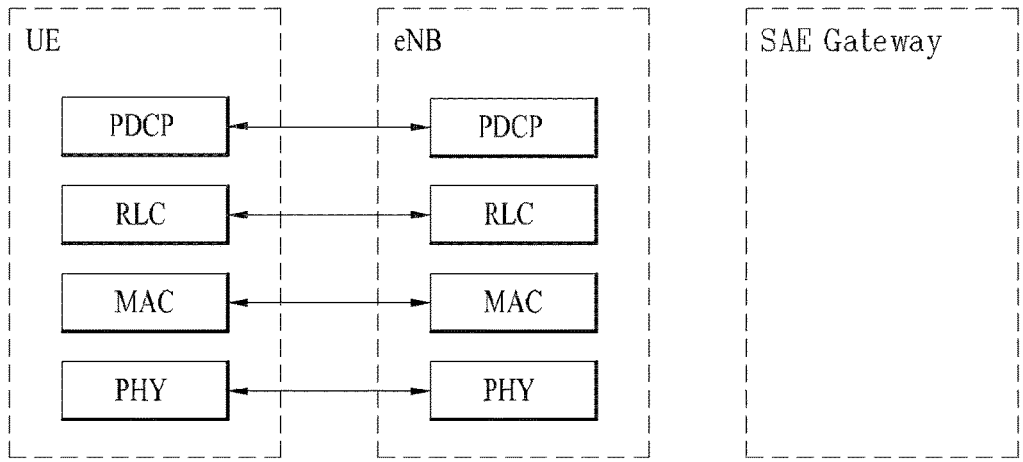
(b) User-plane protocol stack

METHOD FOR RECEIVING SIGNAL USING DISTRIBUTION STORAGE CACHE RETENTION AUXILIARY NODE IN WIRELESS COMMUNICATION SYSTEM, AND APPARATUS THEREFOR

CROSS REFERENCE TO RELATED APPLICATIONS

This application is the National Phase of PCT International Application No. PCT/KR2016/002779, filed on Mar. 18, 2016, which claims priority under 35 U.S.C. 119(e) to U.S. Provisional Application No. 62/135,149, filed on Mar. 18, 2015 and No. 62/211,861, filed on Aug. 30, 2015, all of which are hereby expressly incorporated by reference into the present application.

TECHNICAL FIELD

The present invention relates to a wireless communication system, and more particularly, to a method for receiving a signal using a distribution storage cache retention auxiliary node in a wireless communication system and an apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

Based on the aforementioned discussion, an object of the present invention is to provide a method for receiving a signal using distribution storage cache retention auxiliary nodes in a wireless communication system and an apparatus therefor.

Technical Solution

In one aspect of the present invention, a method for enabling a UE to receive data in a wireless communication system comprises the steps of determining at least one transmission entity for the data among one or more auxiliary nodes and a base station; receiving a distributed code from the determined at least one transmission entity; and acquiring the data from the distributed code, wherein the at least one transmission entity is determined based on a sum of distributed codes stored in the auxiliary nodes and the number of auxiliary nodes existing within a predetermined distance from the UE.

In another aspect of the present invention, a user equipment (UE) in a wireless communication system comprises a wireless communication module for transmitting and receiving a signal through a network; and a processor for processing the signal, wherein the processor controls the wireless communication module to determine at least one transmission entity for the data among one or more auxiliary nodes and a base station, receive a distributed code from the determined at least one transmission entity and acquire the data from the distributed code, and also determines the at least one transmission entity based on a sum of distributed codes stored in the auxiliary nodes and the number of auxiliary nodes existing within a predetermined distance from the UE.

Preferably, a size of the distributed code stored in each of the one or more auxiliary nodes is determined based on the average number of auxiliary nodes existing within a communication area of the UE.

Preferably, if the sum of the distributed codes stored in the auxiliary nodes is smaller than a minimum recovery value, the at least one transmission entity includes all of the one or more auxiliary nodes and the base station. On the other hand, if the sum of the distributed codes stored in the auxiliary nodes is equal to or greater than a minimum recovery value, the at least one transmission entity includes the one or more auxiliary nodes except the base station.

More preferably, the one or more auxiliary nodes include other UEs or femto cell.

Advantageous Effects

According to the embodiment of the present invention, a UE may receive a signal more efficiently by using distribution storage cache retention auxiliary nodes.

The effects of the present invention are not limited to the above-described effects and other effects which are not described herein will become apparent to those skilled in the art from the following description.

BRIEF DESCRIPTION OF THE DRAWINGS

FIG. 2 is a diagram illustrating structures of a control plane and a user plane of a radio interface protocol between a UE and an E-UTRAN based on the 3GPP radio access network specification;

BEST MODE FOR CARRYING OUT THE INVENTION

Figure 1:
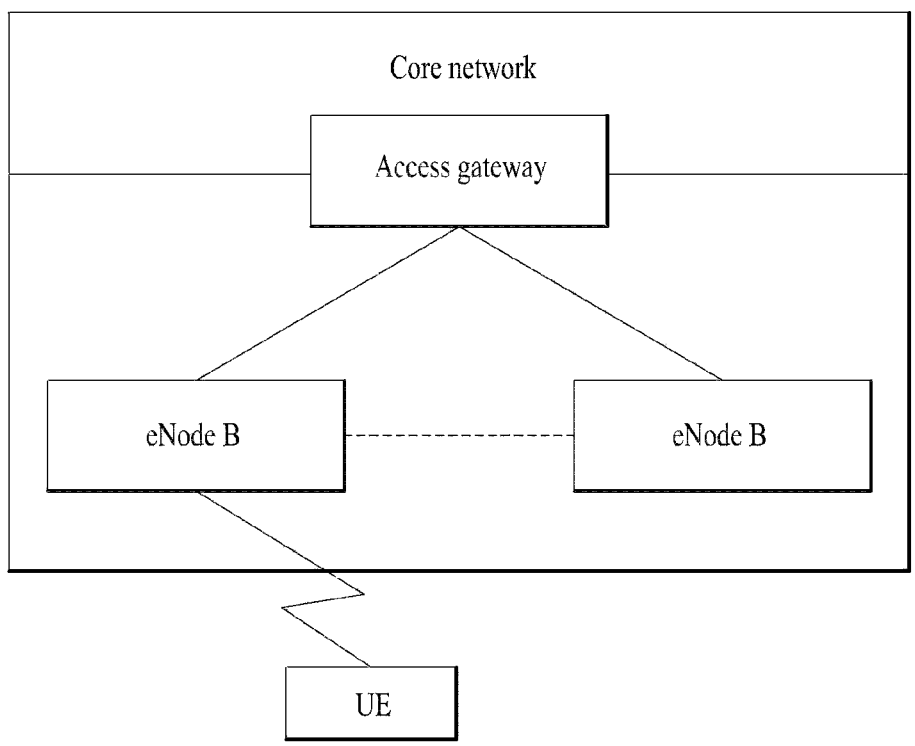
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
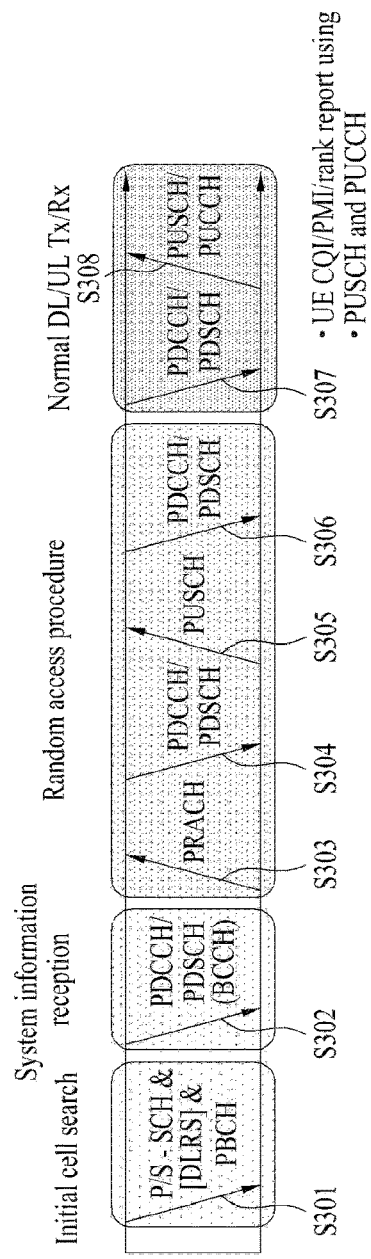
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
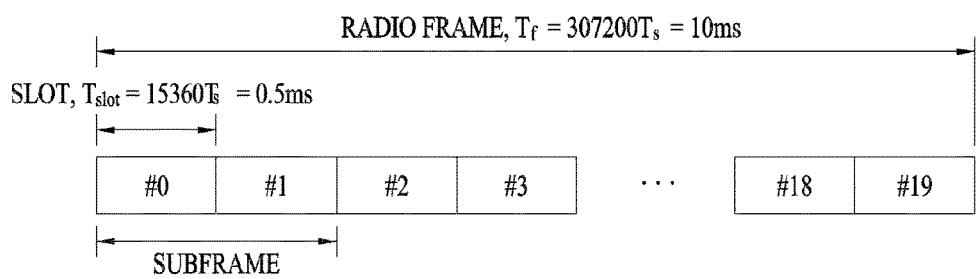
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
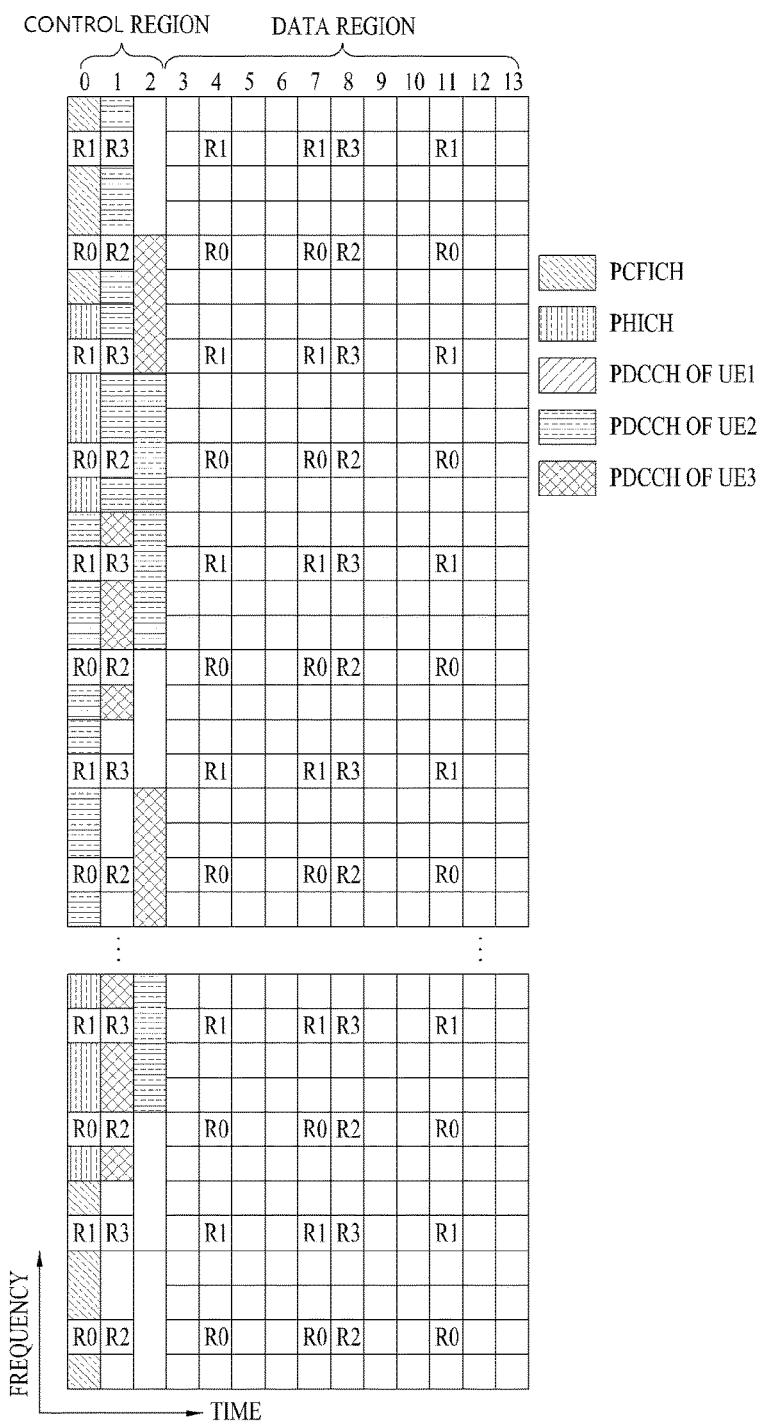
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
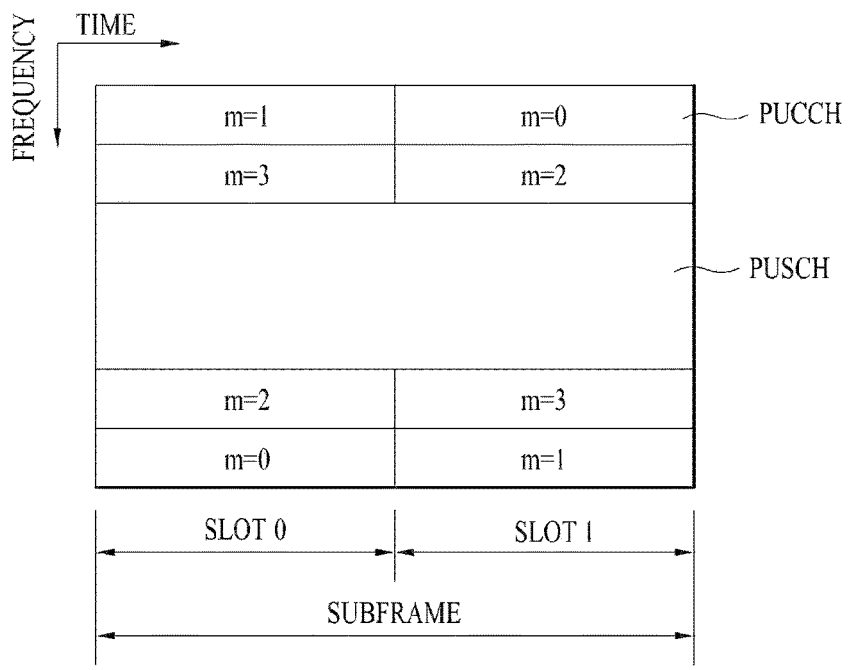
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
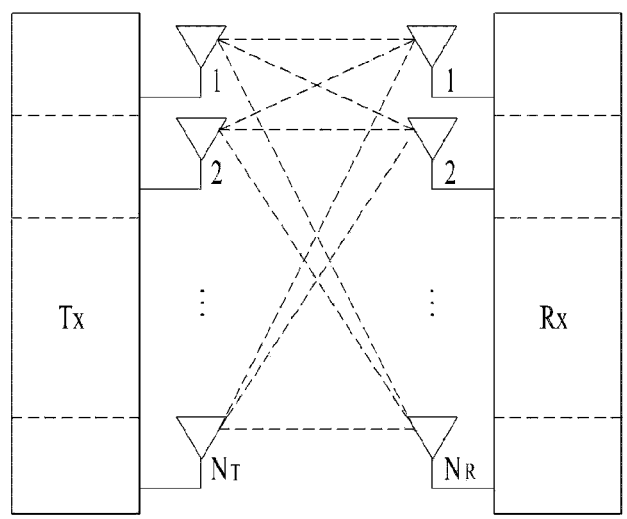
FIG. 7 is a diagram illustrating a configuration of a general MIMO communication system.

FIG. 7 illustrates the configuration of a typical MIMO communication system.

A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \qquad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \qquad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \qquad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

On the other hand, according to the coordinated scheduling/beamforming method (CoMP-CS/CB), a UE may receive data instantaneously through one base station, that is, a serving base station.

According to the joint processing (CoMP-JP) method in UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

The present invention suggests a method for providing a service of data required by a UE to the UE by using a plurality of auxiliary nodes (for example, femto cells or other UEs), which retain a storage cache for previously storing the data, in a mobile communication network.

In the related art, one auxiliary node has provided a service to the UE regardless of the presence of a cache. Even in the case that there is a cache in the auxiliary node, an auxiliary node, which has data required by a UE and is closest to the UE, has provided a service to the UE. In case of Wi-FI having no cache or a small base station of a femto cell, a node geographically closest to the UE has provided a service to the UE. In this case, if there is no auxiliary node having data required by the UE within a certain distance from the UE, the UE receives a service from a mobile communication base station without receiving a service from such an auxiliary node. Also, the cache technology of the related art has a problem in that efficiency is reduced due to independent design of cache and radio resource allocation technologies without consideration of correlation of data required by UEs and correlation of mobile patterns of UEs.

According to the present invention, since data stored in an auxiliary node are stored by distribution through a maximum distance separable (MDS) code, the data may be recovered by assistance of several nodes. The present invention has a big difference from the related art in that MDS coded data (for example, parity bits) are distributively stored in storage devices of several auxiliary nodes unlike the related art scheme that stores data in an auxiliary node in a unit of a complete file. For this reason, several data may be distributed locally and more uniformly. In case of the related art scheme, since data should be stored in their entirety due to unavailable distributive storage, if auxiliary nodes having a restriction in a storage space are distributed in the mobile communication network, limitation in the number of files that may be stored is increased, whereby an auxiliary node near the UE has no file desired by the UE. As a result, a problem occurs in that there is an unavailable service through the auxiliary node.

The scheme of the present invention is similar to CoMP in that service is provided through several nodes. However, the scheme of the present invention is different from CoMP in that data sharing through a backhaul link is required due to characteristic of distributively stored MDS codes. Since data are distributively stored, data may be recovered without depending on a specific node only, whereby it is advantageous that diversity gain may be obtained from several radio channels and thus reliable data transmission may be performed. Also, it is advantageous that data are partially stored through optimized MDS encoding without being fully stored to use only a little a cache of an auxiliary node. Moreover, since the UE receives MDS parity bits through cooperation of auxiliary nodes near the UE, degradation of communication throughput, which is caused by mobility of the UE, may be mitigated and at the same time delay time may be reduced.

To provide data distributively stored as MDS codes to a UE as suggested in the present invention, several auxiliary nodes should be used. Since data are distributively stored in more auxiliary nodes, it is likely that the UE may receive a service of the auxiliary node. Also, the scheme of the present invention is different from the related art scheme in that a set of auxiliary nodes for providing a service to a UE should be determined. Such a set of the auxiliary nodes may be varied dynamically in accordance with a mobility pattern, to provide a service to a UE by forming a set of auxiliary nodes in a mobile communication environment in an amorphous pattern, prediction of statistical information of a data type and channel state and statistical optimization in consideration of the prediction are required. Moreover, since distributive storage is not considered in a radio environment in respect of the existing cache related technology, throughput optimization of distributive storage has not been issued.

Figure 8:
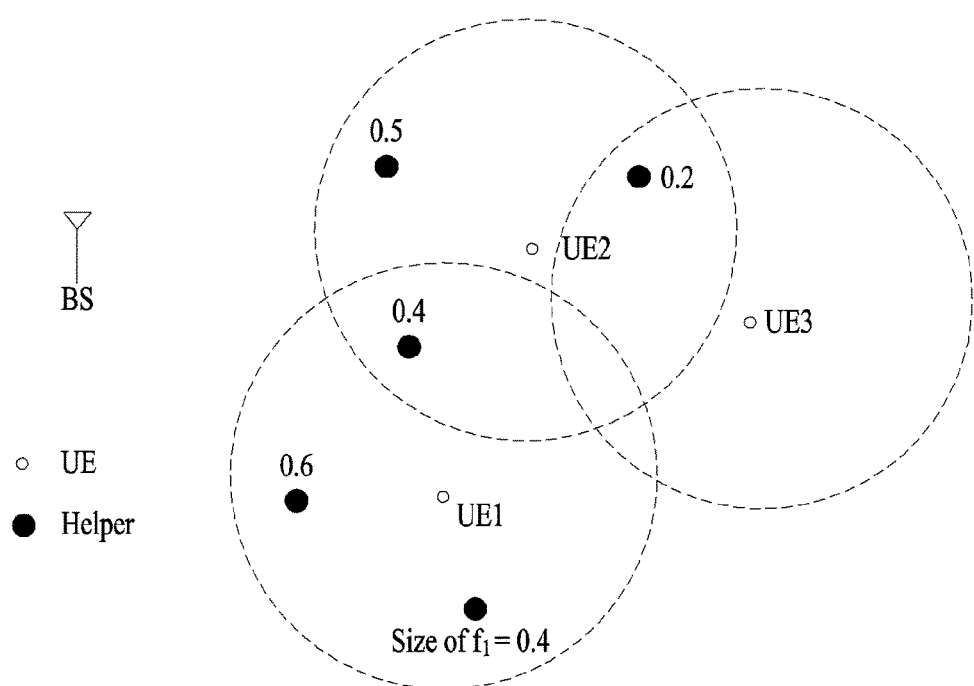
FIG. 8 is a conceptual diagram illustrating a wireless communication system according to the embodiment of the present invention.

FIG. 8 is a conceptual diagram illustrating a wireless communication system according to the embodiment of the present invention. Particularly, in FIG. 8, it is assumed that a base station (BS), a user equipment (UE) and an auxiliary node (helper) exist, and the UE may be supported from auxiliary nodes within a certain distance (or having a good channel).

A small auxiliary base station such as a femto cell introduced in the existing communication network may be an auxiliary node. The auxiliary node may include a storage device, which may store data, that is, a cache. Data frequently used by the UEs are distributed and previously cached, that is, stored in this storage device. Of course, it is assumed that distributive storage is made through MDS code. For example, when it is supposed that there are five storage devices that distributively store a specific file A by coding a size of the specific file as much as ⅓ from the original file, the MDS code means a code that may recover original data by using three random nodes of the five storage devices. To successfully recover the original data, the respective auxiliary nodes store distributive data and transmit MDS coded packets in cooperation with each other.

Hereinafter, criteria for determining whether the auxiliary node stores a file by means of distribution through MDS code or stores an entire file in the same manner as the existing cache system by defining an optimal MDS code storage ratio and probability based on a statistically analyzed value will be suggested.

The present invention is operated in the same manner as the first embodiment or the second embodiment.

First Embodiment—Snapshot Approach

The first embodiment of the present invention is implemented in accordance with the followings 1) to 3).

1) The BS acquires information on the amount of stored data of auxiliary nodes at a certain cycle. Files distributively stored in the auxiliary nodes are stored periodically in consideration of factors such as relative popularity of entire files, maximum capacity of a storage device owned by the auxiliary node and popularity of files in which characteristics of UEs near the auxiliary node are reflected, and the files are updated in the early hours when a cable network or a mobile communication network is relatively less used.

A ratio of MDS codes which will be stored distributively in each auxiliary node is determined probabilistically along Bernoullis distribution in proportion to popularity of files. It is assumed that the probability that the entire of the ith file is stored in the auxiliary node is $p_i$ (<1). In this case, if capacity of the file is $F_i$, an estimated storage value of the file is $F_i p_i$, and if a node of $1/N_i$ performs distributive storage through necessary MDS codes, $F_i p_i/N_i$ becomes an estimated storage value. Therefore, if the estimated storage value of the file i stored in the auxiliary node is maintained uniformly, storage is performed with the probability of $p_i = N_i s_i$. That is, $s_i$ becomes the average number of auxiliary nodes existing in a communication node.

The average storage amount $s_i$ is determined depending on popularity, which is likely to be determined along zipf distribution in case of popular video or file and additionally is affected by preference of a personal user. For efficiency of an auxiliary storage device and improvement of throughput of a communication system, if the file has high popularity, the file has $s_i$ of a high value. Therefore, a procedure of extracting a statistical value for preference distribution by observing preference distribution of a specific file required by a user through an auxiliary node for a certain time period and optimizing a storage ratio of MDS parity bits by reflecting the extracted value is required. Particularly, to maximize offloading effect of a file obtained when a storage ratio of parity bits of a file having high preference is increased, the auxiliary node may update the storage ratio of the parity bits at a certain time period. That is, new popularity distribution is extracted based on preference of users, which is accumulated for a certain time period $t_o$, and the value of $s_i$ is periodically adjusted based on the extracted popularity distribution. Also, a sum of the overall average storage amount determined as above does not exceed a limit storage amount of each auxiliary node.

Figure 9:
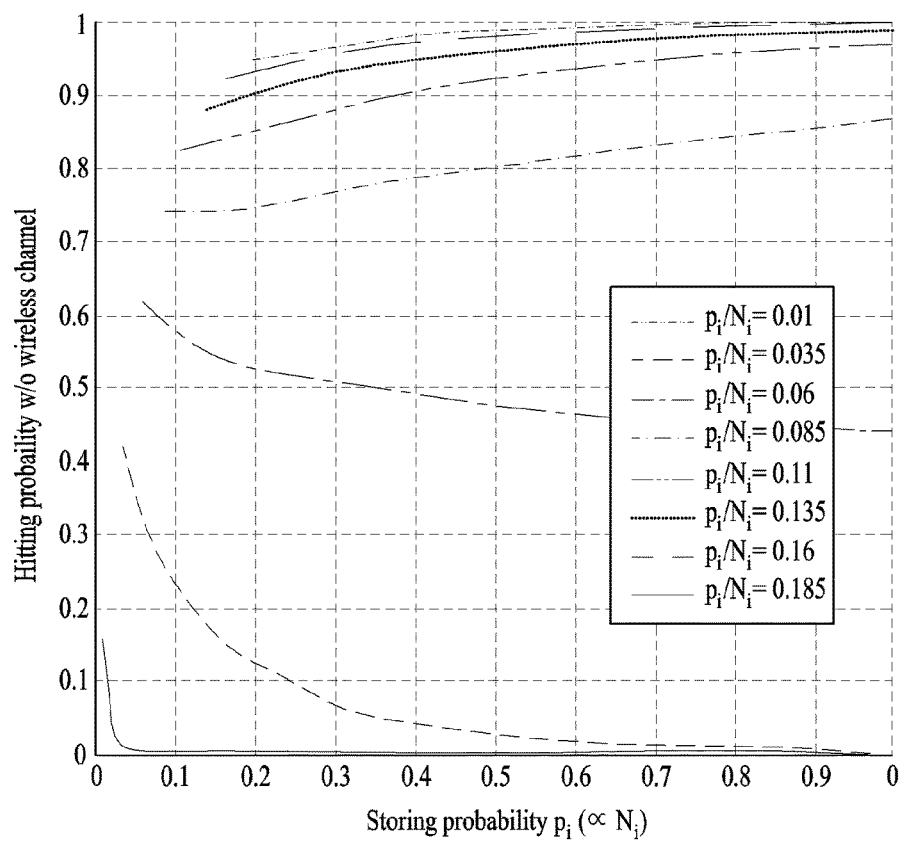
FIG. 9 is a diagram illustrating a relation between storage probability and hitting probability in accordance with the embodiment of the present invention.

Under the circumstances, a level of distributive storage may be determined in accordance with a statistical result of FIG. 9. FIG. 9 is a diagram illustrating a relation between storage probability and hitting probability in accordance with the embodiment of the present invention.

Referring to FIG. 9, the hitting probability is changed depending on a value of $\pi \lambda_f r_c^2 s_i$ ($\lambda_f$ is the average number of auxiliary nodes distributed in each area and $r_c$ is a distance where UE may receive a service), and if a value of $s_i$ is greater than $1/\pi \lambda_f r_c^2$, $p_i$ (>1) becomes higher if possible to enhance the hitting probability. The higher $p_i$ means storage through MDS code of a smaller size if possible. In this case, if the value of $s_i$ is greater than $1/\pi \lambda_f r_c^2$, it may mean that the total storage amount is greater than the original file size and the number of auxiliary nodes is sufficient.

On the contrary, if the value of $s_i$ is smaller than $1/\pi \lambda_f r_c^2$, $p_i$ becomes lower if possible to enhance the hitting probability. In this case, if the value of $s_i$ is smaller than $1/\pi \lambda_f r_c^2$, it may mean that the total storage amount is smaller than the original file size and the number of auxiliary nodes is not sufficient.

2) In the same manner as FIG. 8, the BS transmits information to a UE by using information of auxiliary nodes which are already acquired and located at a certain distance from the UE if one UE or a plurality of UEs require a specific data file. Under the circumstances, a method for enabling a UE to receive a specific data service is categorized into three cases (a) to (c) as follows, and an operation method is selected depending on peripheral statuses (for example, auxiliary node and other UEs existing in the periphery).

(a) The case that the UE receives data from the BS: this case corresponds to the case that there is no auxiliary node near the UE within a certain distance. This case is the same method for providing a service in the existing mobile communication network.

(b) The case that the UE receives data from one or more auxiliary nodes: if a sum of MDS codes stored in the auxiliary nodes within a certain distance exceeds 1 (that is, minimum recovery value), the corresponding UE may receive a service by means of auxiliary nodes only as far as other UE is not located at a service distance from the same auxiliary node as that of the corresponding UE. In this case, since a set of auxiliary nodes that provide a service to a specific UE is determined depending on how data required by the corresponding UE are stored, if different data are required even though the two UEs are located at the same position, a set of auxiliary nodes that provide a service to the corresponding two UEs is varied.

Moreover, if the required data are changed even though the UEs are located at the same position, a set of auxiliary nodes that provide a service may be varied. In this regard, a cell is configured in such a manner that the auxiliary nodes, which provide a service, is varied depending on request data of the UE as well as the position of the UE.

(c) The case that the UE receives data from its neighboring auxiliary node and receives shortage from the BS: if a sum of MDS codes stored in the auxiliary nodes within a certain distance smaller than 1 (that is, minimum recovery value), or even if the sum of MDS codes exceeds the minimum recovery value, the corresponding UE may receive shortage from the BS when the auxiliary node provides a service to other UE, whereby data may completely be recovered.

3) Operation method of each UE and auxiliary nodes that provide a service are determined for offloading of the BS, to provide a service to a large number of UEs if possible by using auxiliary nodes only. If a service is provided to a total of N UEs, the auxiliary nodes are selected considering an optimization problem as expressed by the following Equation.

$$\max_{S_1,\cdots,S_N} \sum_{i=1}^{N} I(i)$$ [Equation 8]

subject to $$I(i) = \sum_{j \in S_i} C(j, i)$$

$$|i - j| \leq T_s$$

$$S_k \cap S_l = \phi \text{ for all } k, l$$

In the above optimization problem, $S_i$ means a set of auxiliary nodes allocated to UE i, and C(j, i) means transmission capacity between the auxiliary node j and UE i. |i−j| means a distance between UE i and the auxiliary node j, and a corresponding restriction condition means that only a UE in a service limit distance $T_s$ of the auxiliary node may receive a service. Each auxiliary node supports only one UE. That is, in the first embodiment, an operation method of a UE and an auxiliary node is suggested to maximize capacity of the overall system.

Second Embodiment—Mixed Time Scale Approach

The second embodiment of the present invention is implemented in accordance with the followings x) to z).

x) It is assumed that the auxiliary nodes are clustered in a hot spot area to update a cache and manage mobility. The BS acquires information on the amount of stored data of the auxiliary nodes which belong to the cluster and an average channel state at a certain cycle. An update cycle of files stored in the cluster is variable depending on signaling overhead or complexity of the system.

The files in the cluster are updated in consideration of relative popularity of entire files, maximum capacity of a storage device owned by the auxiliary node, popularity of files in which characteristics of UEs near the auxiliary node are reflected, mobility pattern of the UE, and average channel capacity that can be provided by the auxiliary node.

y) A method for enabling a UE to receive a specific data service is categorized into three cases in the same manner as (a) to (c) of the first embodiment, and an operation method is selected depending on peripheral statuses (for example, auxiliary node and other UEs existing in the periphery).

z) Operation method of each UE and a set of auxiliary nodes that provide a service are given to maximize an available reward, for example, delay time reduction when the corresponding set is given. When there are a total of F types of data, K number of auxiliary nodes, N number of UEs, the reward is obtained as a cache control matrix Q (F×K) and a channel allocation matrix A (N×K) for scheduling are optimized at the same time. In more detail, a combined optimization problem is expressed by the following Equation 9.

$$\max_{Q,A} \mathbb{E}_\pi[\bar{r}_\pi(Q, A) | \pi]$$ [Equation 9]

subject to $$Q \in \mathcal{D}_Q, A \in \mathcal{D}_A$$

In the optimization problem of the above Equation 9, r is a reward, and π is a URP (user request profile). The above optimization problem may be decomposed into a subproblem for optimizing Q such as the following Equation 10 by using popularity of average file and channel information and a subproblem for optimizing A at a momentary time t as expressed by the following Equation 11.

$$\max_{Q} \mathbb{E}_\pi[\bar{r}_\pi(Q, A) | \pi]$$ [Equation 10]

subject to $$Q \in \mathcal{D}_Q$$

$$\max_{A} r_\pi^t(Q, A)$$ [Equation 11]

subject to $$A \in \mathcal{D}_A$$

In other words, in the second embodiment of the present invention, a method for operating an optimal cluster to maximize a reward obtained by the introduction of auxiliary nodes and an approximate optimal algorithm of low complexity.

In the above-described embodiments of the present invention, file may mean an individual file desired by each user to be actually received. However, in this case, the number of files defined on the overall system is rapidly increased, whereby overhead for distributively storing entire files in the auxiliary nodes and managing the files may be increased significantly. To mitigate overhead, a unit for distributively storing entire files in the auxiliary nodes and managing the files may be defined as a file group which is a set of a plurality of files. Preferably, files which belong to the same file group may have attributes the same as or similar to one another in service type (for example, audio or video), a service provider, a QoS level, and popularity, etc.

According to the present invention, load of the BS that provides a service to the UE may be mitigated through usage and distributive storage of the storage device, whereby efficiency of a mobile communication network may be improved. In more detail, since a UE near which auxiliary nodes exist may receive all or some of request data through the auxiliary nodes, load of the mobile communication network may be mitigated. Also, the UE may stably receive data of high capacity without delay time immediately through the auxiliary nodes in the periphery.

Also, in the existing communication network, a backhaul link should be used additionally even though a small base station is used. However, in the present invention, since data are previously stored in the storage device when traffic of a backhaul link is small, traffic of the backhaul link may be reduced. Since the UE may dynamically form a set of auxiliary nodes in an amorphous type even in a communication environment having mobility, quality of experience (QoE) of a mobile communication service may be improved remarkably. Efficiency of the overall mobile communication system, for example, cell capacity, delay time, management cost, etc. may be improved through efficient usage of communication resources based on the storage device.

Figure 10:
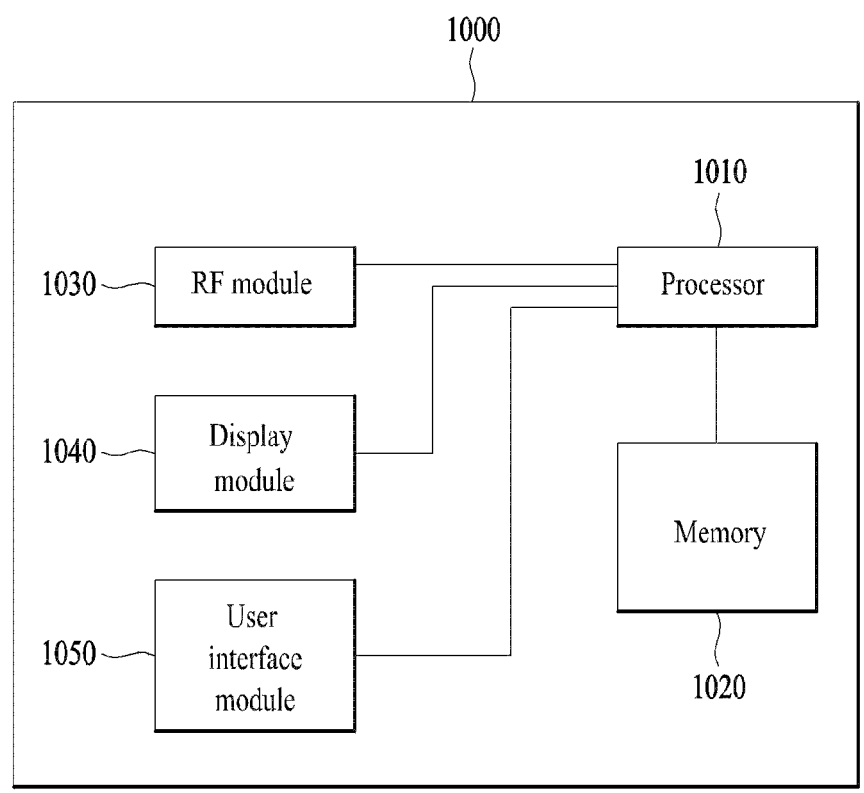
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method for receiving a signal using a distribution storage cache retention auxiliary node in a wireless communication system and the apparatus therefor have been described based on the 3GPP LTE system, the method and the apparatus may be applied to various wireless communication systems in addition to the 3GPP LTE system.

The invention claimed is:

1. A method for receiving data by a user equipment (UE) in a wireless communication system, the method comprising:
   determining at least one transmission entity for the data among one or more auxiliary nodes and a base station;
   receiving a distributed code from the determined at least one transmission entity; and
   acquiring the data from the distributed code,
   wherein the at least one transmission entity is determined based on a sum of distributed codes stored in the auxiliary nodes and a number of auxiliary nodes existing within a predetermined distance from the UE.

2. The method according to claim 1, wherein a size of the distributed code stored in each of the one or more auxiliary nodes is determined based on the average number of auxiliary nodes existing within a communication area of the UE.

3. The method according to claim 1, wherein, if the sum of the distributed codes stored in the auxiliary nodes is smaller than a minimum recovery value, the at least one transmission entity includes all of the one or more auxiliary nodes and the base station.

4. The method according to claim 1, wherein, if the sum of the distributed codes stored in the auxiliary nodes is equal to or greater than a minimum recovery value, the at least one transmission entity includes the one or more auxiliary nodes except the base station.

5. The method according to claim 1, wherein the one or more auxiliary nodes include other UEs or femto cell.

6. A user equipment (UE) in a wireless communication system, the UE comprising:
   a wireless communication module for transmitting and receiving a signal through a network; and
   a processor for processing the signal,
   wherein the processor controls the wireless communication module to determine at least one transmission entity for the data among one or more auxiliary nodes and a base station, receive a distributed code from the determined at least one transmission entity and acquire the data from the distributed code, wherein the processor determines the at least one transmission entity based on a sum of distributed codes stored in the auxiliary nodes and a number of auxiliary nodes existing within a predetermined distance from the UE.

7. The UE according to claim 6, wherein a size of the distributed code stored in each of the one or more auxiliary nodes is determined based on the average number of auxiliary nodes existing within a communication area of the UE.

8. The UE according to claim 6, wherein, if the sum of the distributed codes stored in the auxiliary nodes is smaller than a minimum recovery value, the at least one transmission entity includes all of the one or more auxiliary nodes and the base station.

9. The UE according to claim 6, wherein, if the sum of the distributed codes stored in the auxiliary nodes is equal to or greater than a minimum recovery value, the at least one transmission entity includes the one or more auxiliary nodes except the base station.

10. The UE according to claim 6, wherein the one or more auxiliary nodes include other UEs or femto cell.

\* \* \* \* \*